US007672843B2

(12) United States Patent
Srinivasan et al.

(10) Patent No.: US 7,672,843 B2
(45) Date of Patent: Mar. 2, 2010

(54) AUDIO SIGNATURE EXTRACTION AND CORRELATION

(75) Inventors: Venugopal Srinivasan, Palm Harbor, FL (US); Keqiang Deng, Safety Harbor, FL (US); Daozheng Lu, Dunedin, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 930 days.

(21) Appl. No.: 11/143,808

(22) Filed: Jun. 2, 2005

(65) Prior Publication Data

US 2005/0232411 A1 Oct. 20, 2005

Related U.S. Application Data

(63) Continuation of application No. 09/427,970, filed on Oct. 27, 1999, now abandoned.

(51) Int. Cl.
*G10L 15/00* (2006.01)

(52) U.S. Cl. ....................... 704/231; 704/246; 704/243; 725/18

(58) Field of Classification Search ................. 704/231, 704/246, 243; 725/18
See application file for complete search history.

(56) References Cited

U.S. PATENT DOCUMENTS

| | | | |
|---|---|---|---|
| 2,573,279 | A | 10/1951 | Scherbatskoy |
| 2,630,525 | A | 3/1953 | Tomberlin et al. |
| 2,766,374 | A | 10/1956 | Hoffman |
| 3,004,104 | A | 10/1961 | Hembrooke |
| 3,492,577 | A | 1/1970 | Relter et al. |
| 3,684,838 | A | 8/1972 | Kahn |
| 3,760,275 | A | 9/1973 | Ohsawa et al. |
| 3,845,391 | A | 10/1974 | Crosby |
| 3,919,479 | A | 11/1975 | Moon et al. |
| 4,025,851 | A | 5/1977 | Haselwood et al. |
| 4,053,710 | A | 10/1977 | Advani et al. |

(Continued)

FOREIGN PATENT DOCUMENTS

| | | |
|---|---|---|
| CA | 2041754 | 11/1991 |

(Continued)

OTHER PUBLICATIONS

"Digital Audio Watermarking," Audio Media, Jan./Feb. 1998, pp. 56, 57, 59 and 61.

(Continued)

*Primary Examiner*—Qi Han
(74) *Attorney, Agent, or Firm*—Hanley, Flight & Zimmerman LLC.

(57) ABSTRACT

A signature is extracted from the audio of a program received by a tunable receiver such that the signature characterizes the program. In order to extract the signature, blocks of the audio are converted to corresponding spectral moments. At least one of the spectral moments is then converted to the signature. Also, a test audio signal from a receiver is correlated to a reference audio signal by converting the test audio signal and the reference audio signal to corresponding test and reference spectra, determining test slopes corresponding to coefficients of the test spectrum and reference slopes corresponding to coefficients of the reference spectrum, and comparing the test slopes to the reference slopes in order to determine a match between the test audio signal and the reference audio signal.

21 Claims, 6 Drawing Sheets

U.S. PATENT DOCUMENTS

| | | | |
|---|---|---|---|
| 4,225,967 | A | 9/1980 | Miwa et al. |
| 4,238,849 | A | 12/1980 | Gassmann |
| 4,282,403 | A | 8/1981 | Sakoe |
| 4,313,197 | A | 1/1982 | Maxemchuk |
| 4,425,642 | A | 1/1984 | Moses et al. |
| 4,432,096 | A | 2/1984 | Bunge |
| 4,450,531 | A | 5/1984 | Kenyon et al. |
| 4,512,013 | A | 4/1985 | Nash et al. |
| 4,523,311 | A | 6/1985 | Lee et al. |
| 4,677,466 | A | 6/1987 | Lert, Jr. et al. |
| 4,697,209 | A | 9/1987 | Kiewit et al. |
| 4,703,476 | A | 10/1987 | Howard |
| 4,739,398 | A | 4/1988 | Thomas et al. |
| 4,750,173 | A | 6/1988 | Bluthgen |
| 4,771,455 | A | 9/1988 | Hareyama et al. |
| 4,843,562 | A | 6/1989 | Kenyon et al. |
| 4,876,617 | A | 10/1989 | Best et al. |
| 4,931,871 | A | 6/1990 | Kramer |
| 4,943,973 | A | 7/1990 | Werner |
| 4,945,412 | A | 7/1990 | Kramer |
| 4,972,471 | A | 11/1990 | Gross et al. |
| 4,979,513 | A | 12/1990 | Sakai et al. |
| 5,113,437 | A | 5/1992 | Best et al. |
| 5,121,428 | A | 6/1992 | Uchiyama et al. |
| 5,210,820 | A | 5/1993 | Kenyon |
| 5,213,337 | A | 5/1993 | Sherman |
| 5,319,735 | A | 6/1994 | Preuss et al. |
| 5,379,345 | A | 1/1995 | Greenberg |
| 5,394,274 | A | 2/1995 | Kahn |
| 5,404,377 | A | 4/1995 | Moses |
| 5,450,490 | A | 9/1995 | Jensen et al. |
| 5,473,631 | A | 12/1995 | Moses |
| 5,563,942 | A | 10/1996 | Tulai |
| 5,572,246 | A | 11/1996 | Ellis et al. |
| 5,574,962 | A | 11/1996 | Fardeau et al. |
| 5,579,124 | A | 11/1996 | Aijala et al. |
| 5,581,800 | A | 12/1996 | Fardeau et al. |
| 5,594,934 | A | 1/1997 | Lu et al. |
| 5,612,729 | A | 3/1997 | Ellis et al. |
| 5,629,739 | A | 5/1997 | Dougherty |
| 5,687,191 | A | 11/1997 | Lee et al. |
| 5,712,953 | A * | 1/1998 | Langs ........................ 704/214 |
| 5,764,763 | A | 6/1998 | Jensen et al. |
| 5,787,334 | A | 7/1998 | Fardeau et al. |
| 5,822,360 | A | 10/1998 | Lee et al. |
| 5,832,119 | A | 11/1998 | Rhoads |
| 5,852,806 | A | 12/1998 | Johnston et al. |
| 5,930,369 | A | 7/1999 | Cox et al. |
| 6,035,177 | A | 3/2000 | Moses et al. |
| 6,151,578 | A | 11/2000 | Bourcet et al. |
| 6,272,176 | B1 | 8/2001 | Srinivasan |
| 6,504,870 | B2 | 1/2003 | Srinivasan |
| 6,570,888 | B1 | 5/2003 | Huang et al. |
| 6,621,881 | B2 | 9/2003 | Srinivasan |
| 6,807,230 | B2 | 10/2004 | Srinivasan |
| 7,006,555 | B1 | 2/2006 | Srinivasan |
| 2004/0122679 | A1 | 6/2004 | Neuhauser et al. |
| 2005/0232411 | A1 | 10/2005 | Srinivasan et al. |
| 2006/0020958 | A1 | 1/2006 | Allamanche et al. |

FOREIGN PATENT DOCUMENTS

| | | |
|---|---|---|
| CA | 2041754 | 12/2004 |
| DE | 43 16 297 | 4/1994 |
| DE | 4316297 | 4/1994 |
| EP | 0 243 561 | 4/1987 |
| EP | 0243561 | 11/1987 |
| EP | 0 535 893 | 4/1993 |
| EP | 0535893 | 4/1993 |
| GB | 2 170 080 | 7/1986 |
| GB | 2170080 | 7/1986 |
| GB | 2 260 246 | 4/1993 |
| GB | 2260246 | 4/1993 |
| GB | 2 292 506 | 2/1996 |
| GB | 2292506 | 2/1996 |
| JP | 09009213 | 10/1989 |
| JP | 07 059030 | 3/1995 |
| JP | 07059030 | 3/1995 |
| JP | 09 009213 | 1/1997 |
| WO | WO08909985 | 10/1989 |
| WO | WO8909985 | 10/1989 |
| WO | WO9307689 | 4/1993 |
| WO | WO9411989 | 5/1994 |
| WO | WO09411989 | 5/1994 |
| WO | WO09527349 | 10/1995 |
| WO | WO09638927 | 12/1996 |
| WO | WO09806195 | 2/1998 |
| WO | WO09820672 | 5/1998 |
| WO | WO00131816 | 5/2001 |
| WO | WO002065782 | 8/2002 |

OTHER PUBLICATIONS

International Search Report, dated Aug. 27, 1999, Application No. PCT/US98/23558.

Namba, S. et al., "A Program Identification Code Transmission System Using Low-Frequency Audio Signals," NHK Laboratories Note, Ser. No. 314, Mar. 1985.

Steele, R. et al., "Simultaneous Transmission of Speech and Data Using Code-Breaking Techniques," The Bell System Tech. Jour., vol. 60, No. 9, pp. 2081-2105, Nov. 1981.

International Search Report, dated Aug. 18, 2000, Application No. PCT/US00/03829.

United States Patent and Trademark Office, Before the Board of Patent Appeals and Interferences, Decision on Appeal for U.S. Appl. No. 09/427,970, filed Aug. 7, 2007, 14 pages.

International Searching Authority, International Search Report for application PCT/US98/23558, Aug. 27, 1999, 6 pages.

Digital Audio Watermarking, Audio Media, Jan/Feb 1998, pp. 56, 57, 59, 61.

International Searching Authority, International Search Report for application PCT/US00/03829, Aug. 18, 2000, 3 pages.

European Patent Office, European Search Report for EP Application No. 07014944.8, Sep. 25, 2007, 9 pages.

Mitchell D. Swanson, "Robust audio watermarking using perceptual masking," Signal Processing, vol. 66 No. 3 (1998-05), pp. 337-355.

Intellectual Property Office of New Zealand, Examination Report of NZ patent application 519169, Mar. 18, 2004, 1 page.

Canadian Intellectual Property Office, Office Action for CA application 2,332,977, Oct. 30, 2008, 2 pages.

European Patent Office, European Search Report for EP Application No. 04014598.9, Sep. 20, 2007, 5 pages.

International Searching Authority, International Preliminary Examination Report for application PCT/US98/23558, Nov. 7, 2000, 10 pages.

International Searching Authority, Written Opinion for application PCT/US98/23558, 7 pages, Jun. 28, 2000.

European Patent Office, Office Communication for EP application 07014944.8, Sep. 25, 2007, 5 pages.

European Patent Office, Office Communication for EP application 04014598.9, Oct. 1, 2008,5 pages.

European Patent Office, Office Communication for EP application 04014598.9, Oct. 29, 2007, 2 pages.

United States Patent and Trademark Office, Office Action for U.S. Appl. No. 09/428,425, Mar. 5, 2003, 5 pages.

United States Patent and Trademark Office, Office Action for U.S. Appl. No. 09/428,425, Aug. 13, 2003, 11 pages.

United States Patent and Trademark Office, Office Action for U.S. Appl. No. 09/428,425, Mar. 25, 2004, 10 pages.

United States Patent and Trademark Office, Office Action for U.S. Appl. No. 09/882,085, Jan. 24, 2002, 9 pages.

United States Patent and Trademark Office, Office Action for U.S. Appl. No. 09/882,089, Jul. 30, 2002, 9 pages.

United States Patent and Trademark Office, Office Action for U.S. Appl. No. 10/444,409, Mar. 30, 2004, 10 pages.
United States Patent and Trademark Office, Office Action for U.S. Appl. No. 10/444,409, Oct. 31, 2003, 7 pages.
Canadian Intellectual Property Office, Canadian Office Action for Canadian application No. 2,310,769, dated Dec. 23, 2008, 2 pages.

* cited by examiner

AUDIO SIGNATURE EXTRACTION AND CORRELATION

CROSS REFERENCE TO RELATED APPLICATIONS

This application is a continuation of U.S. patent application Ser. No. 09/427,970, filed Nov. 29, 1999, now abandoned.

RELATED APPLICATION

This application contains disclosure similar to the disclosure in U.S. application Ser. No. 09/428,425, now U.S. Pat. No. 7,006,176, which is a continuation-in-part of U.S. Ser. No. 09/116,397, now U.S. Pat. No. 6,272,176.

TECHNICAL FIELD OF THE INVENTION

The present invention relates to audio signature extraction and/or audio correlation useful, for example, in identifying television and/or radio programs and/or their sources.

BACKGROUND OF THE INVENTION

Several approaches to metering the video and/or audio tuned by television and/or radio receivers in order to determine the sources or identities of corresponding television or radio programs are known. For example, one approach is to real time correlate a program to which the tuner of a receiver is tuned with each of the programs available to the receiver as derived from an auxiliary tuner. An arrangement adopting this approach is disclosed in U.S. application Ser. No. 08/786,270 filed Jan. 22, 1997. Another arrangement useful for this measurement approach is found in the teachings of Lu et al. in U.S. Pat. No. 5,594,934.

There are several desirable properties for a correlation system. For example, good matches or mismatches should result from very short program segments. Longer program segments delay the correlation process because the time taken to scan through all available programs increases accordingly. Also, the correlation score should be high when the output from the receiver and the output from the auxiliary tuner correspond to the same program. Matches between two different programs must occur very infrequently. Moreover, the matching criteria should be independent of signal level so that signal level does not affect the correlation score.

Another approach is to add ancillary identification codes to television and/or radio programs and to detect and decode the ancillary codes in order to identify the encoded programs or the corresponding sources of the programs when the programs are tuned by monitored receivers. There are many arrangements for adding an ancillary code to a signal in such a way that the added code is not noticed. For example, it is well known to hide such ancillary codes in non-viewable portions of television video by inserting them into either the video's vertical blanking interval or horizontal retrace interval. An exemplary system which hides codes in non-viewable portions of video is referred to as "AMOL" and is taught in U.S. Pat. No. 4,025,851. This system is used by the assignee of this application for monitoring transmissions of television programs as well as the times of such transmissions.

Other known video encoding systems have sought to bury the ancillary code in a portion of a television signal's transmission bandwidth that otherwise carries little signal energy. An example of such a system is disclosed by Dougherty in U.S. Pat. No. 5,629,739, which is assigned to the assignee of the present application.

Other methods and systems add ancillary codes to audio signals for the purpose of identifying the signals and, perhaps, for tracing their courses through signal distribution systems. Such arrangements have the obvious advantage of being applicable not only to television, but also to radio and to pre-recorded music. Moreover, ancillary codes which are added to audio signals may be reproduced in the audio signal output by a speaker. Accordingly, these arrangements offer the possibility of non-intrusively intercepting and decoding the codes with equipment that has a microphone as an input. In particular, these arrangements provide an approach to measuring broadcast audiences by the use of portable metering equipment carried by panelists.

In the field of encoding audio signals for program audience measurement purposes, Crosby, in U.S. Pat. No. 3,845,391, teaches an audio encoding approach in which the code is inserted in a narrow frequency "notch" from which the original audio signal is deleted. The notch is made at a fixed predetermined frequency (e.g., 40 Hz). This approach led to codes that were audible when the original audio signal containing the code was of low intensity.

A series of improvements followed the Crosby patent. Thus, Howard, in U.S. Pat. No. 4,703,476, teaches the use of two separate notch frequencies for the mark and the space portions of a code signal. Kramer, in U.S. Pat. No. 4,931,871 and in U.S. Pat. No. 4,945,412 teaches, inter alia, using a code signal having an amplitude that tracks the amplitude of the audio signal to which the code is added.

Program audience measurement systems in which panelists are expected to carry microphone-equipped audio monitoring devices that can pick up and store inaudible codes transmitted in an audio signal are also known. For example, Aijalla et al., in WO 94/11989 and in U.S. Pat. No. 5,579,124, describe an arrangement in which spread spectrum techniques are used to add a code to an audio signal so that the code is either not perceptible, or can be heard only as low level "static" noise. Also, Jensen et al., in U.S. Pat. No. 5,450,490, teach an arrangement for adding a code at a fixed set of frequencies and using one of two masking signals in order to mask the code frequencies. The choice of masking signal is made on the basis of a frequency analysis of the audio signal to which the code is to be added. Jensen et al. do not teach a coding arrangement in which the code frequencies vary from block to block. The intensity of the code inserted by Jensen et al. is a predetermined fraction of a measured value (e.g., 30 dB down from peak intensity) rather than comprising relative maxima or minima.

Moreover, Preuss et al., in U.S. Pat. No. 5,319,735, teach a multi-band audio encoding arrangement in which a spread spectrum code is inserted in recorded music at a fixed ratio to the input signal intensity (code-to-music ratio) that is preferably 19 dB. Lee et al., in U.S. Pat. No. 5,687,191, teach an audio coding arrangement suitable for use with digitized audio signals in which the code intensity is made to match the input signal by calculating a signal-to-mask ratio in each of several frequency bands and by then inserting the code at an intensity that is a predetermined ratio of the audio input in that band. As reported in this patent, Lee et al. have also described a method of embedding digital information in a digital waveform in pending U.S. application Ser. No. 08/524,132.

U.S. patent application Ser. No. 09/116,397 filed Jul. 16, 1998 discloses a system and method using spectral modulation at selected code frequencies in order to insert a code into the program audio signal. These code frequencies are varied from audio block to audio block, and the spectral modulation may be implemented as amplitude modulation, modulation by frequency swapping, phase modulation, and/or odd/even index modulation.

Yet another approach to metering video and/or audio tuned by televisions and/or radios is to extract a characteristic signature (or a characteristic signature set) from the program selected for viewing and/or listening, and to compare the characteristic signature (or characteristic signature set) with reference signatures (or reference signature sets) collected from known program sources at a reference site. Although the reference site could be the viewer's household, the reference site is usually at a location which is remote from the households of all of the viewers being monitored. The signature approach is taught by Lert and Lu in U.S. Pat. No. 4,677,466 and by Kiewit and Lu in U.S. Pat. No. 4,697,209.

In the signature approaches, audio characteristic signatures are often extracted. Typically, these characteristic signatures are extracted by a unit located at the monitored receiver, sometimes referred to as a site unit. The site unit monitors the audio output of a television or radio receiver either by means of a microphone that picks up the sound from the speakers of the monitored receiver or by means of an output line from the monitored receiver. The site unit extracts and transmits the characteristic signatures to a central household unit, sometimes referred to as a home unit. Each characteristic signature is designed to uniquely characterize the audio signal tuned by the receiver during the time of signature extraction.

Characteristic signatures are typically transmitted from the home unit to a central office where a matching operation is performed between the characteristic signatures and a set of reference signatures extracted at a reference site from all of the audio channels that could have been tuned by the receiver in the household being monitored. A matching score is computed by a matching algorithm and is used to determine the identity of the program to which the monitored receiver was tuned or the program source (such as the broadcaster) of the tuned program.

There are several desirable properties for audio characteristic signatures. The number of bytes in each characteristic signature should be reasonably low such that the storage of a characteristic signature requires a small amount of memory and such that the transmission of a characteristic signature from the home unit to the central office requires a short transmission time. Also, each characteristic signature must be robust such that characteristic signatures extracted from both the output of a microphone and the output lines of the receiver result in substantially identical signature data. Moreover, the correlation between characteristic signatures and reference signatures extracted from the same program should be very high and consequently the correlation between characteristic signatures and reference signatures extracted from different programs should be very low.

Accordingly, the present invention is directed to the extraction of signatures and to a correlation technique having one or more of the properties set out above.

SUMMARY OF THE INVENTION

According to one aspect of the present invention, a method of extracting a signature from audio of a program received by a tunable receiver is provided. The signature characterizes the program. The method comprises the following steps: a) converting the audio to corresponding spectral moments; and, b) converting at least one of the spectral moments to the signature.

According to another aspect of the present invention, a method of extracting a signature from a program received by a tunable receiver is provided. The signature characterizes the program. The method comprises the following steps: a) converting the program to a corresponding frequency related spectrum; and, b) converting a frequency related component of the frequency related spectrum to the signature.

According to still another aspect of the present invention, a method of correlating a test audio signal derived from a receiver to a reference audio signal comprises the following steps: a) converting the test audio signal to a corresponding frequency related test spectrum; b) selecting segments between frequency related components of the frequency related test spectrum as test segments; and, c) comparing the test segments to reference segments derived from the reference audio signal in order to determine a match between the test audio signal and the reference audio signal.

According to yet another aspect of the present invention, a method of correlating a test audio signal derived from a receiver to a reference audio signal comprises the following steps: a) converting the test audio signal to a test spectrum; b) determining test slopes corresponding to coefficients of the test spectrum; c) converting the reference audio signal to a reference spectrum; d) determining reference slopes corresponding to coefficients of the reference spectrum; and, e) comparing the test slopes to the reference slopes in order to determine a match between the test audio signal and the reference audio signal.

BRIEF DESCRIPTION OF THE DRAWING

These and other features and advantages will become more apparent from a detailed consideration of the invention when taken in conjunction with the drawings in which.

DETAILED DESCRIPTION OF THE INVENTION

In the context of the following description, a frequency is related to a frequency index by the exemplary predetermined relationship set out below in equation (1). Accordingly, frequencies resulting from a transform, such as a Fourier Transform, may then be indexed in a range, such as −256 to +255. The index of 255 is set to correspond, for example, to exactly half of a sampling frequency $f_s$, although any other suitable correspondence between any index and any frequency may be chosen. If an index of 255 is set to correspond to exactly half a sampling frequency $f_s$, and if the sampling frequency is forty-eight kHz, then the highest index 255 corresponds to a frequency of twenty-four kHz.

The exemplary predetermined relationship between a frequency and its frequency index is given by the following equation:

$$I_j = \left(\frac{255}{24}\right) \cdot f_j \quad (1)$$

where equation (1) is used in the following discussion to relate a frequency $f_j$ to its corresponding index $I_j$.

Figure 1:
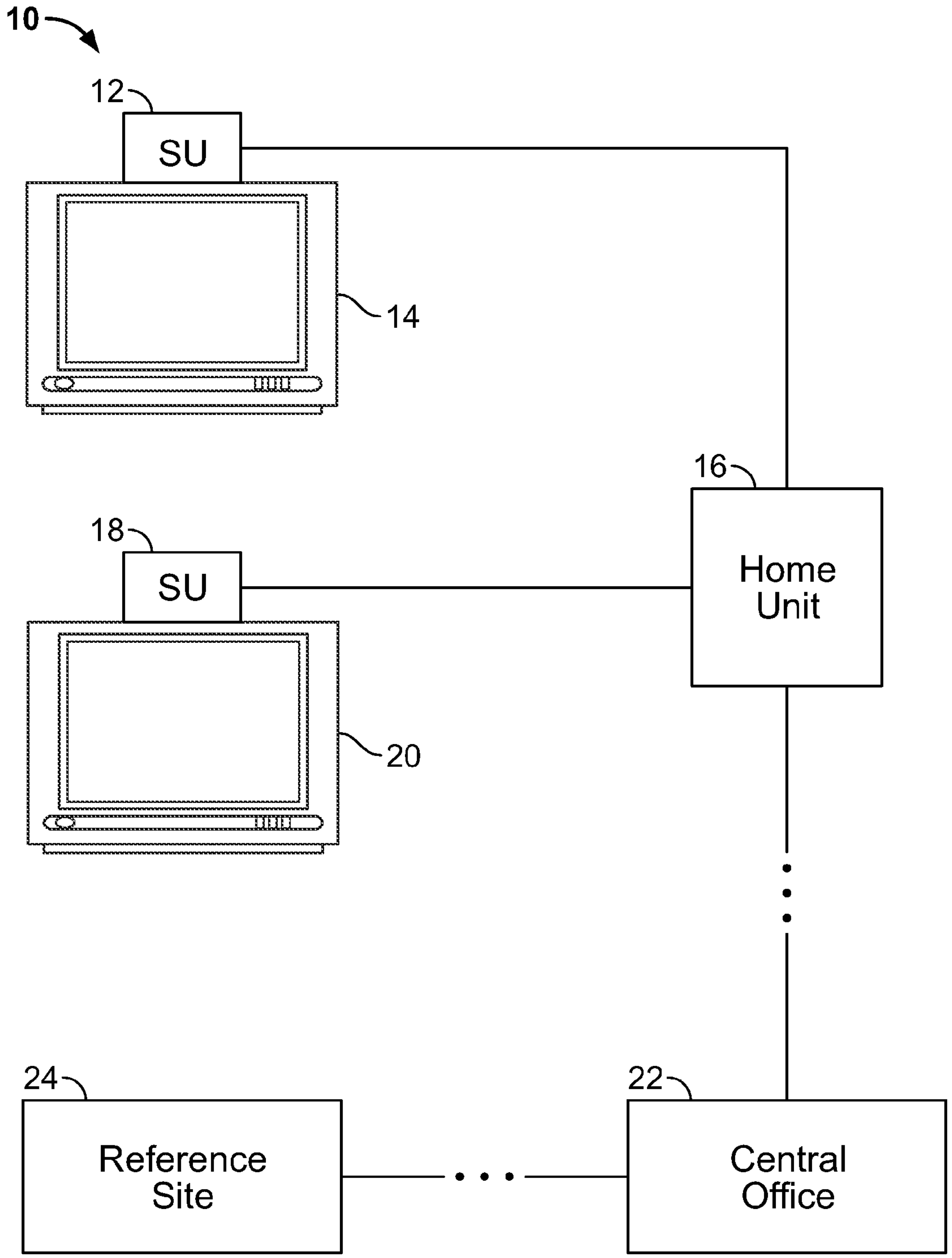
FIG. 1 is a schematic block diagram of an audience measurement system in accordance with a spectral signature portion of the present invention.

FIG. 1 shows an arrangement for identifying programs selected for viewing and/or listening and/or for identifying the sources of programs selected for viewing and/or listening based upon characteristic signatures extracted from program audio. Within a household 10, characteristic signatures are extracted by a site unit 12 from the audio tuned by a monitored receiver 14. Although the monitored receiver 14 is shown as a television, it could be a radio or other receiver or tuner. Each characteristic signature is designed to uniquely characterize the audio tuned by the monitored receiver 14 during the time that the corresponding characteristic signature is extracted. For the purpose of audio signature extraction, the site unit 12 may be arranged to monitor the audio output of the monitored receiver 14 either by means of a microphone that picks up the sound from the speakers of the monitored receiver 14 or by means of an audio output jack of the monitored receiver 14. The site unit 12 transmits the characteristic signatures it extracts to a home unit 16.

To the extent that the household 10 contains other receivers to be monitored, additional site units may be provided. For example, characteristic signatures are also extracted by a site unit 18 located at a monitored receiver 20. The site unit 18 may also be arranged to monitor the audio output of the monitored receiver 20 either by means of a microphone or by means of an audio output jack of the monitored receiver 14. The site unit 18 likewise transmits the characteristic signatures it extracts to the home unit 16.

Characteristic signatures are accumulated and periodically transmitted by the home unit 16 to a central office 22 where a matching operation is performed between the characteristic signatures extracted by the site units 12 and 18 and a set of reference signatures extracted at a reference site 24 from each of the audio channels that could have been tuned by the monitored receivers 14 and 20 in the household 10. The reference site 24 can be located at the household 10, at the central office 22, or at any other suitable location. Matching scores are computed by the central office 22, and the matching scores are used to determine the identity of the programs to which the monitored receivers 14 and 20 were tuned or the program sources (such as broadcasters) of the tuned programs.

Reference signatures are extracted at the reference site 24, for example, by use of an array of Digital Video Broadcasting (DVB) tuners each set to receive a corresponding one of a plurality of channels available for reception in the geographical area of the household 10. With the advent of digital television, the task of creating and storing reference signatures by conventional methods is somewhat more complicated and costly. This increase in complexity and cost results because each major digital television channel, as defined by the Advanced Television Standards Committee (ATSC), can carry either a single High Definition Television (HDTV) program or several Standard Definition Television (SDTV) programs in a corresponding number of minor channels. Therefore, a signature which can be extracted directly from an ATSC digital bit stream would be more efficient and economical.

At the reference site 24, a spectral moment signature is extracted, as described below, utilizing the ATSC bit stream directly. The audio in an ATSC bit stream is conveyed as a compressed AC-3 encoded stream. The compression algorithm used to generate the compressed encoded stream is based on the Modified Discrete Cosine Transform (MDCT) and, when decoded, transform coefficients rather than actual time domain samples of audio are obtained. Thus, reference signatures can be extracted at the reference site 24 by decoding the audio of a received program signal as selected by a corresponding tuner in order to recover the audio MDCT coefficients and by converting these MDCT coefficients directly to spectral moment signatures in the manner described below, without the need of first digitizing an analog audio signal and then performing a MDCT on the digitized audio signal.

The monitored receivers 14 and 20 could also provide these MDCT coefficients directly to the site units 12 and 18. However, such coefficients are not available to the site units 12 and 18 without intruding into the cabinets of the monitored receivers 14 and 20. Because the panelists at the household 10 might object to such intrusions into their receivers, it is preferable for the site units 12 and 18 to derive the MDCT or other coefficients non-intrusively.

These MDCT or other coefficients can be derived non-intrusively by extracting an analog audio signal from the monitored receiver 14, such as by picking up the sound from the speakers of the monitored receiver 14 through the use of a microphone or by connection to an audio output jack of the monitored receiver 14, by converting the extracted analog audio signal to digital form, and by transforming the digitized audio signal using either the MDCT or a Fast Fourier Transform (FFT). The resulting MDCT or FFT coefficients are converted to a spectral moment signature as described below.

As explained immediately below, a useful feature of spectral moment signatures is that spectral moment signatures produced by a MDCT and spectral moment signatures produced by a FFT are virtually identical.

Spectral moment signatures are derived from blocks of audio consisting of 512 consecutive digitized audio samples. The sampling rate may be 48 kHz in the case of an ATSC bit stream. Each block of audio samples has an overlap with its neighboring audio blocks. That is, each block of audio samples consists of 256 samples from a previous audio block and 256 new audio samples.

In the AC-3 bit stream, the 512 samples from each audio block are transformed using a MDCT into 256 real numbers which are the resulting MDCT coefficients for that block. In a qualitative sense, each of these numbers can be interpreted as representing a spectral frequency component ranging from 0 to 24 kHZ. However, they are not identical to the FFT coefficients for the same block because the 256 unique FFT coefficients are complex numbers.

Figure 2:
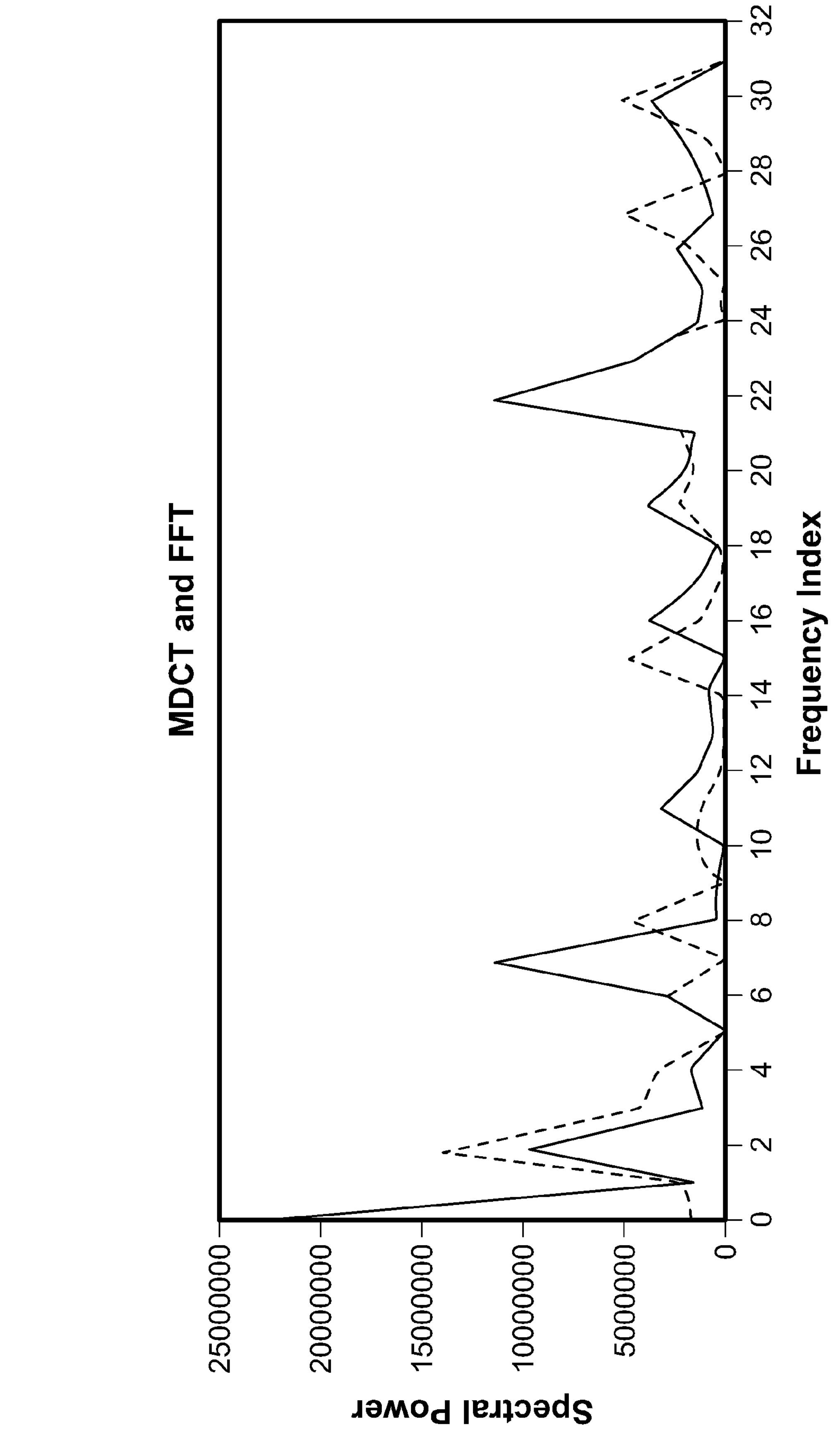
FIG. 2 is a spectral plot of the square of the MDCT coefficients (the solid line) and the FFT power spectrum (the dashed line) of an audio block.

The square of the magnitudes of the FFT coefficients represents the power spectrum of the audio block. A plot of the square of the MDCT coefficients and of the FFT power spectrum for the same audio block are shown as a solid line and a dashed line, respectively, in FIG. 2. (As shown in FIG. 2, the frequency indexes have been offset by forty merely for convenience and, therefore, the actual frequency index ranges from 40 to 72.) Even though there are differences between the two curves, there is an overall similarity that makes it possible to extract MDCT and FFT signatures that are compatible with one another.

For each audio block n, a spectral moment can be computed as follows:

$$M_n = \sum_{k=k_1}^{k=k_2} kT_k \quad (2)$$

where k is the frequency index, $T_k$ is the spectral power at the frequency index k (either FFT or MDCT), and $k_1$ and $k_2$ represent a frequency band across which the moment is computed. In practical cases, moments computed in the frequency range of 4.3 kHZ to 6.5 kHz corresponding to a frequency index range of 45 to 70 work well for most audio signals. If this range is used in equation (2), then $k_1$=45 and $k_2$=70.

Figure 3:
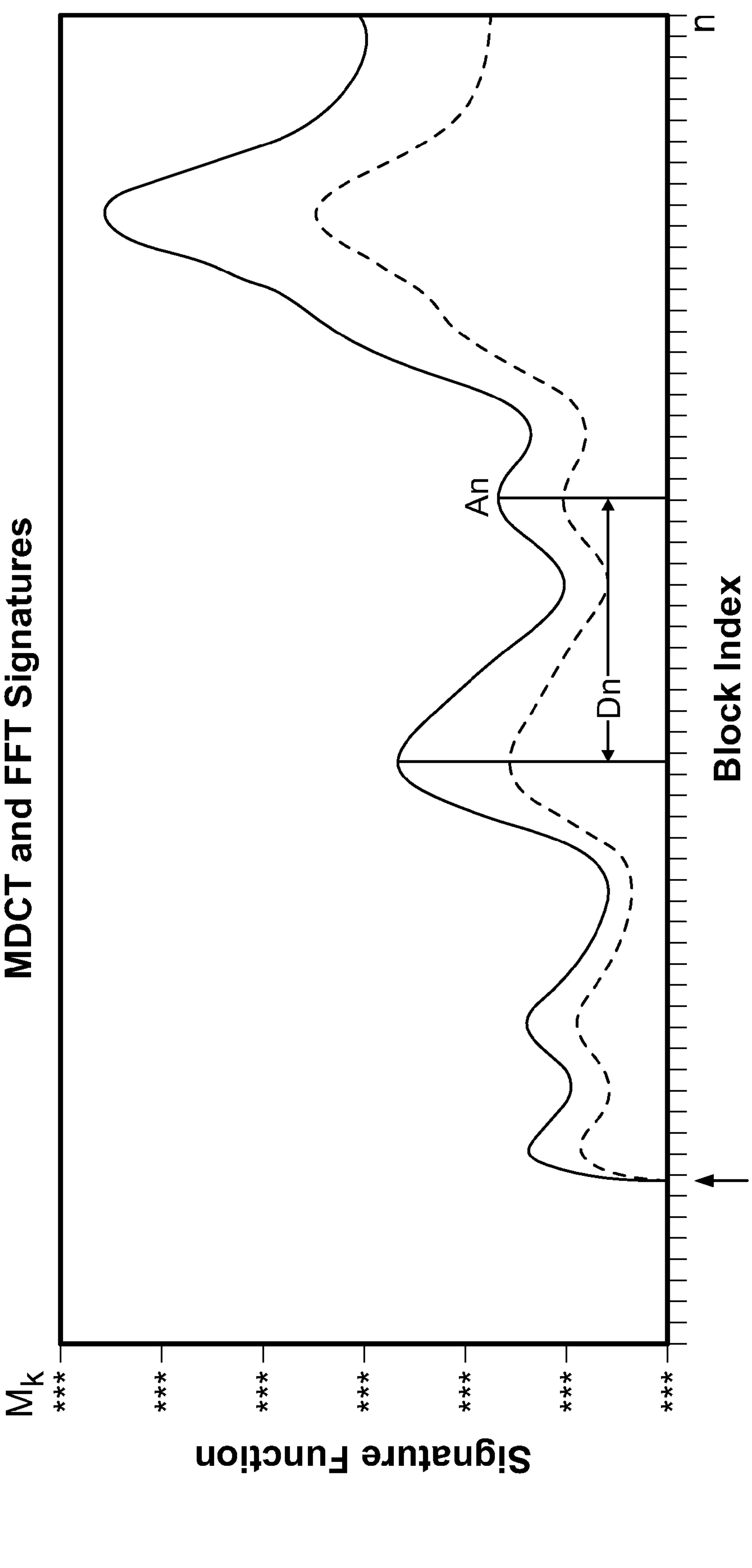
FIG. 3 is a plot showing a smoothed spectral moment function derived from the spectral power function of FIG. 2.

The spectral moment $M_n$ is computed for each successive audio block, and the values for the moment $M_n$ are smoothed by iterative averaging across thirty-two consecutive blocks according to the following equation:

$$M_{n-31} = \frac{\sum_{i=n-31}^{i=n} M_i}{32} \quad (3)$$

such that, when the spectral moment $M_n$ for the block n is computed, the smoothed output $M_{n-31}$ becomes available. Due to the overlapping nature of the blocks, the computations above are equivalent to computing a moving average across a 16×10.6=169 ms time interval. FIG. 3 shows the resulting smoothed spectral moment function for the MDCT coefficients (solid line) and for the FFT power spectrum (dashed line) based upon the same set of audio blocks.

The x-axis of FIG. 3 is block index. The blocks from which spectral moments are computed are indexed in sequence, and the spectral moments are plotted as shown in FIG. 3 as a function of the block indexes of their corresponding blocks. The block index is equivalent to a time representation because the time between blocks is about 5.3 ms. Thus, though the spectral moments are computed from the frequency spectrum of successive blocks, the spectral moment signatures are derived from the time domain function obtained by plotting the spectral moments against the block index. As discussed more fully below, the maximums of the function shown in FIG. 3 form the time instants at which signatures are extracted.

It should be noted that the AC-3 compression algorithm occasionally switches to a short block mode in which the audio block size is reduced to 256 samples of which 128 samples are from a previous block and the remaining 128 samples are new. The reason for performing this switch is to handle transients or sharp changes in the audio signal. In the AC-3 bit stream, the switch from a long block to a short block is indicated by a special bit called the block switch bit. When such a switch is detected by the reference site 24 through the use of this block switch bit, the spectral moment signature algorithm of the present invention may be arranged to create the power spectrum of a long block by appending the power spectra of two short blocks together.

A spectral moment signature is extracted at each peak of the smoothed spectral moment function (such as that shown in FIG. 3). Each spectral moment signature consists of two bytes of data. One byte of data is the maximum of the corresponding peak amplitude of the smoothed moment function and may be represented by a number $A_n$ in the range of 0 to 255. The other byte is the distance $D_n$ in units of time between the current amplitude maximum and the previous amplitude maximum. An example of a spectral moment signature is shown in FIG. 3. The unit of time could be conveniently chosen to correspond to the time duration of an audio block. The matching algorithm analyzes the sequence of ($A_n$, $D_n$) pairs recorded over several seconds at the site units 12 and 18 and the sequence of ($A_n$, $D_n$) pairs recorded at the reference site 24 in order to determine the presence of a match, if it exists. The number of ($A_n$, $D_n$) pairs in the sequence of ($A_n$, $D_n$) pairs and the corresponding number of seconds may be set as desired.

As suggested above, the reference signatures can be extracted at the reference site 24 as spectral moment signatures directly from the MDCT transform coefficients. On the other hand, because signatures produced from either MDCT coefficients or FFT coefficients are virtually identical, as discussed above, signatures may be produced at the site units 12 and 18 from either MDCT coefficients or FFT coefficients, whichever is more convenient and/or cost effective. Either MDCT or FFT signatures will adequately match the MDCT reference signatures if the signatures are extracted from the same audio blocks.

As discussed above, digital video broadcasting (DVB) includes the possibility of transmitting several minor channels on a single major channel. In order to non-invasively identify the major and minor channel, the analog audio output from a program being viewed may be compared with all available digital audio streams. Thus, this audio comparison has to be performed in general against several minor channels.

Figure 4:
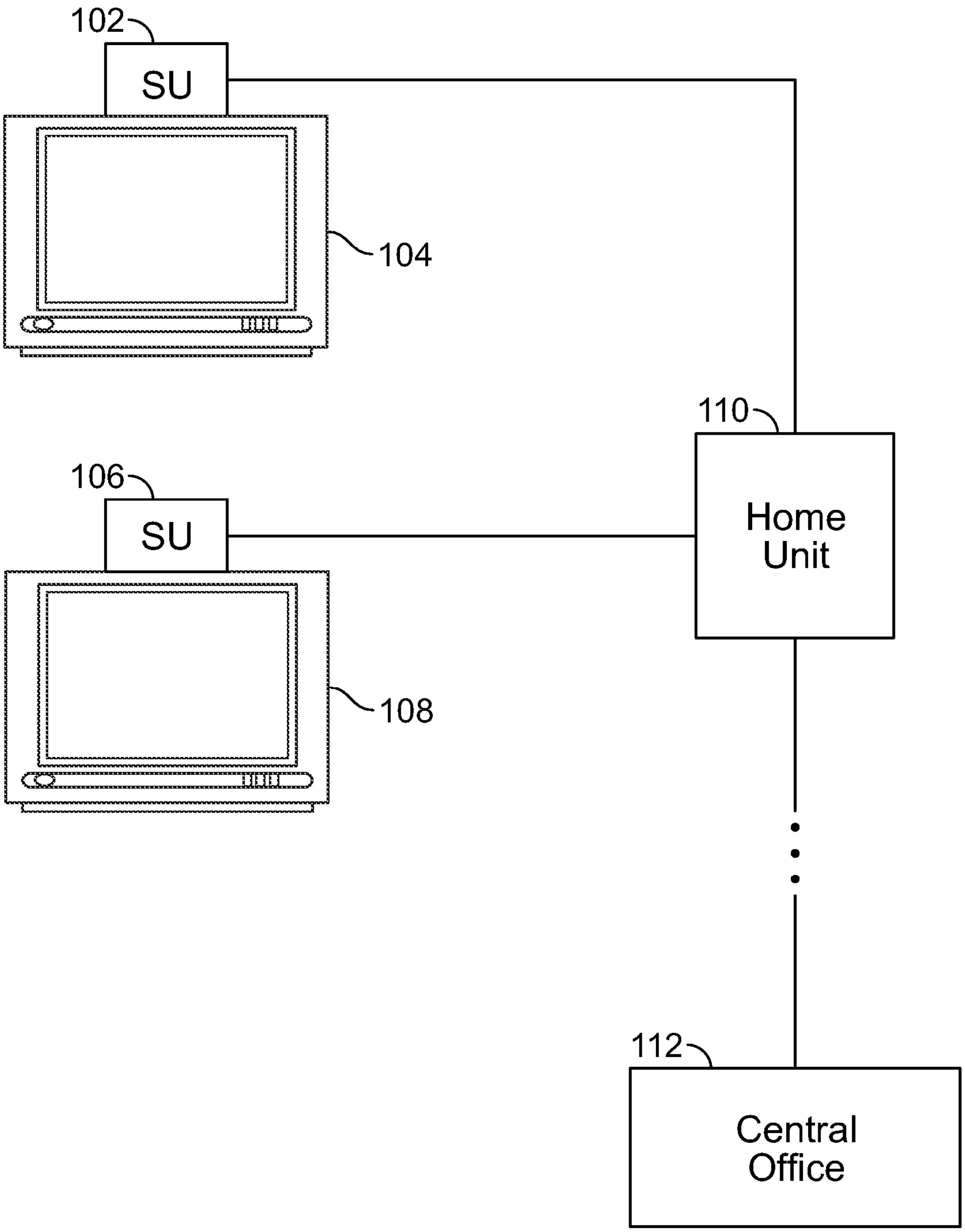
FIG. 4 is a schematic block diagram of an audience measurement system in accordance with a spectral correlation portion of the present invention.

FIG. 4 shows an arrangement for identifying channels selected for viewing and/or listening based upon a correlation performed between the output of a monitored receiver and the channels to which the monitored receiver may be tuned. Within a household 100, a site unit 102 is associated with a monitored receiver 104 and a site unit 106 is associated with a monitored receiver 108. An auxiliary DVB scanning tuner may be provided in each of the site units 102 and 106. Each auxiliary DVB scanning tuner sequentially produces all available digital audio streams carried in all of the major and minor channels tunable by the monitored receivers 104 and 108.

For this purpose, an MDCT may be used to generate the spectrum of several successive overlapping blocks of the analog audio output from the monitored receiver 104 and 108 in a manner similar to the signature extraction discussed above. This audio output is the audio of a program tuned by the appropriate monitored receiver 104 and/or 108. Typically, each block of audio has a 10 ms duration. A corresponding MDCT spectrum is also derived directly from the digital audio bit-stream associated with a DVB major-minor channel pair at the output of the auxiliary DVB scanning tuner. The block of audio from the output of the monitored receivers 104 and 108 and the block of audio from the output of the auxiliary DVB scanning tuner are considered matching if more than 80% of the slopes of the spectral pattern, i.e. the lines joining adjacent spectral peaks, match. If several consecutive audio blocks, say sixteen, indicate a match, it may be concluded that the source tuned by the monitored receivers 104 and 108 is the same as the major-minor channel combination to which the auxiliary DVB scanning tuner is set.

In practical applications, it is necessary to provide a means of handling audio streams that are not synchronized. For example, a j-block reference audio from the auxiliary DVB scanning tuner may be compared with a k-block test audio from the monitored receivers 104 and 108 by time shifting the reference audio across the test audio in order to locate a match, if any. For example, j may be 16 and k may be much longer, such as 128. This time shifting operation is computationally intensive, but can be simplified by the use of a sliding Fourier transform algorithm such as that described below.

Accordingly, each of the site units 102 and 106 may be provided with the auxiliary DVB scanning tuner discussed above so as to rapidly scan across all possible major channels and across all possible minor channels within each of the major channels. The site units 102 and 106 may also include a digital signal processor (DSP) which produces a set of reference spectral slopes from the output of the auxiliary DVB scanning tuner, which produces a set of test spectral slopes from the audio output of the monitored receiver 104 or 108 as derived from either a microphone or a line output of the corresponding monitored receiver 104 and 108, and which compares the reference spectral slopes to the test spectral slopes in order to determine the presence of a match.

As described above, the reference spectral slopes and the test spectral slopes, which are compared in order to determine the presence of a match, are derived through the use of a MDCT. Other processes, such as a FFT, may be used to derive the reference and test slopes. In this regard, it should be noted that MDCT derived slopes may be compared to MDCT derived slopes, and FFT derived slopes may be compared to FFT derived slopes, but MDCT derived slopes should preferably not be compared to FFT derived slopes.

Figure 5:
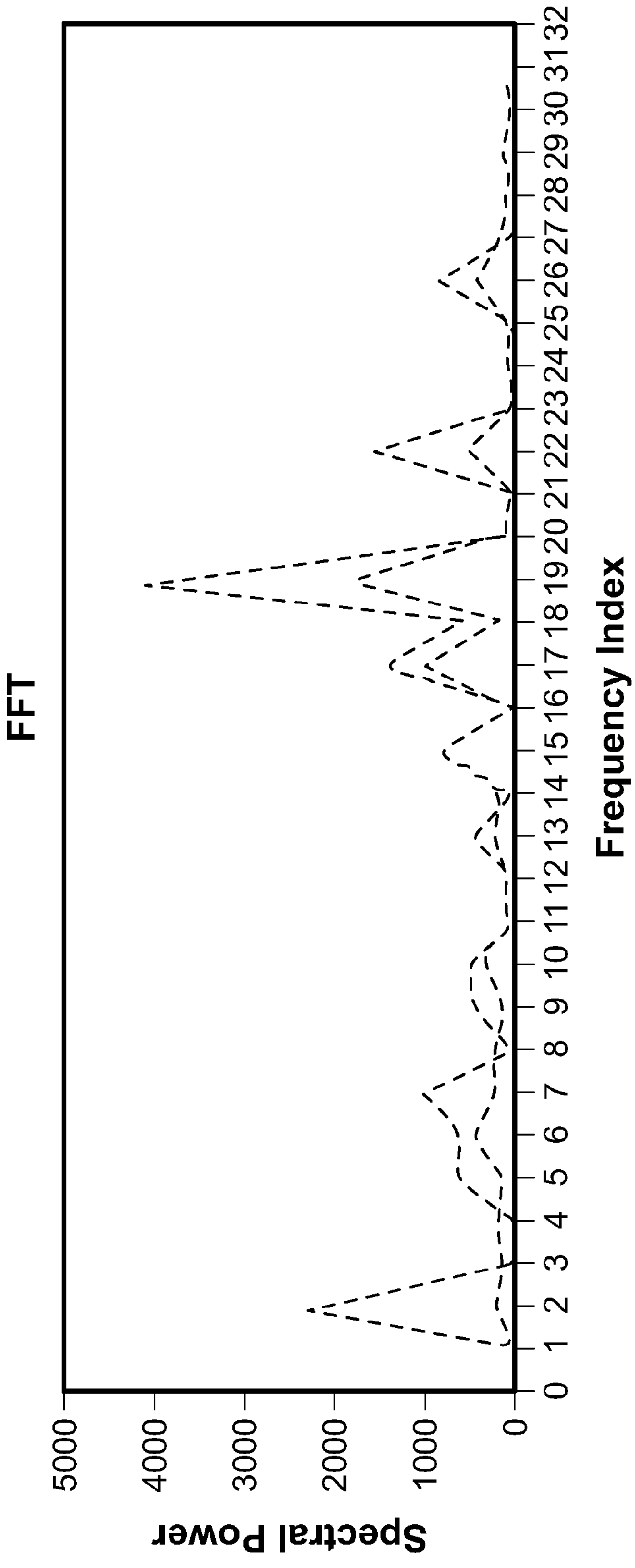
FIG. 5 is a plot of the Fourier Transform power spectra of two matching audio signals; and, FIG. 6 is a plot of the Fourier Transform power spectra of two audio signals which do not match.

FIG. 5 shows the Fourier Transform power spectra of two matched audio signals. (As in the case of FIG. 2, the frequency indexes shown in FIG. 5 have been offset by forty.) One of these audio signals (e.g., from the output of the auxiliary DVB tuner) is treated as a reference signal while the other (e.g., from the monitored receiver 104 or 108) represents an unknown or test signal that has to be identified. The spectra are obtained from a Fast Fourier Transform of blocks of audio consisting of 512 digitized samples of each audio stream obtained by sampling at a 48 kHz rate. As discussed above with respect to signatures, similar spectra may also be obtained by using a MDCT. Also, as discussed above with respect to signatures, the frequency index $f_{max}$ associated with the maximum spectral amplitude $P_{max}$ can be computed. In the example shown, $f_{max}=19$ and $P_{max}=4200$. In order to eliminate the effect of noise associated with most real-world audio signals, only spectral power values that are greater than $P_{min}$, where $P_{min}=0.05P_{max}$, are used by the matching algorithm.

The digital signal processors of the site units 102 and 106 determine the reference and test slopes on each side of each of those spectral power values which are greater than $P_{min}$, and compares the reference and test slopes. Two corresponding slopes are considered to match if they have the same sign. That is, two corresponding slopes match if they are both positive or both negative. For an audio block with an index n, a matching score can then be computed as follows:

$$S_n = \frac{N_{matched}}{N_{total}} \tag{4}$$

where $N_{matched}$ is the number of spectral line segments which match in slope for both audio signals, and $N_{total}$ is the total number of line segments in the audio spectrum used as a reference. If $S_n>K$ (where K, for example, may be 0.8), then the two audio signals match.

Figure 6:
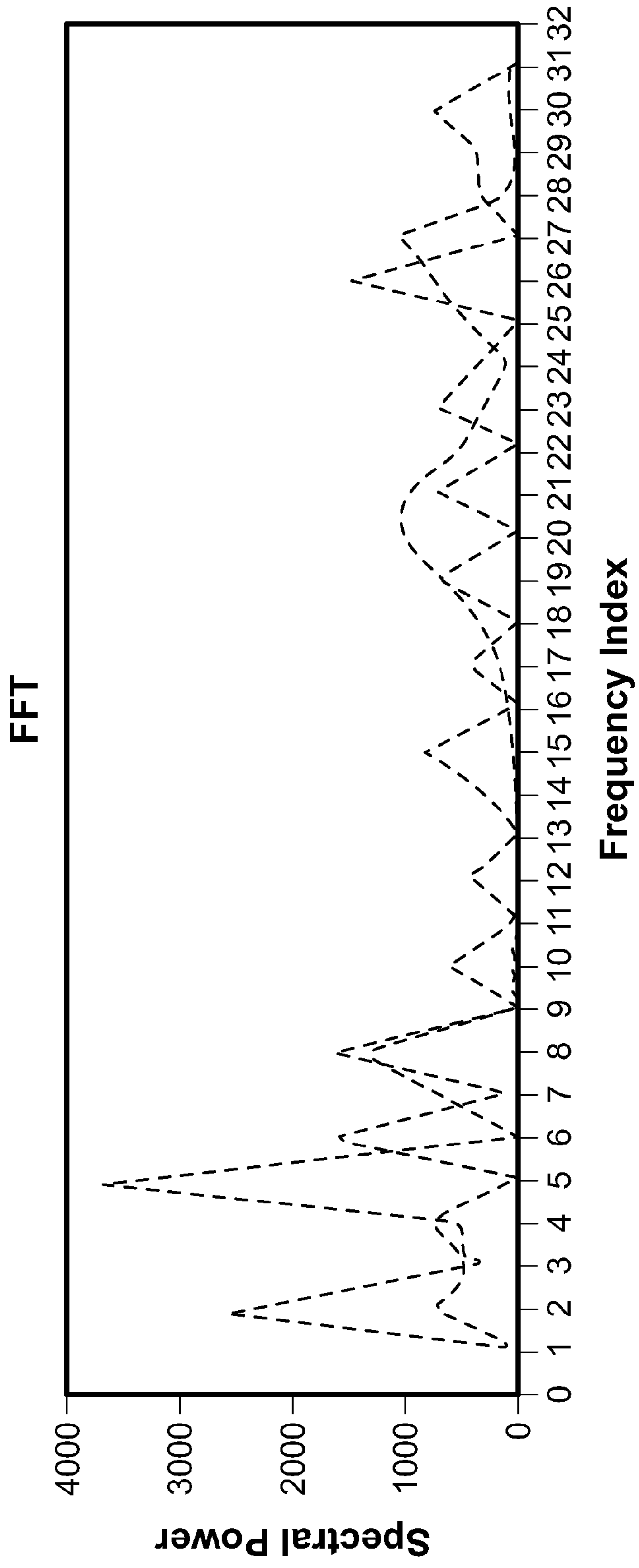

FIG. 6 shows the case where two audio signals do not match. (As in the case of FIGS. 2 and 5, the frequency indexes shown in FIG. 6 have been offset by forty.) It is clear that, in this case, most of the line segments have slopes that do not match.

A match obtained between two audio signals based on a single block is not reliable because the block represents an extremely short 10 ms segment of the signal. In order to achieve robust correlation, the spectral slope matching computation described herein is instead performed over several successive blocks of audio. A match across sixteen successive blocks representing a total duration of 160 ms provides good results.

Correlation of audio signals that are well synchronized can be performed by the method disclosed above. However, in practical cases, there can be a considerable delay between the two audio signals. In such cases, it is necessary to analyze a much longer audio segment in order to determine correlation. For example, 128 successive blocks for both the reference and test audio streams may be stored. This number of blocks represents an audio duration of 1.28 seconds. Then, the Fourier spectrum of sixteen successive blocks of audio extracted from the central section of the reference audio stream is then computed and stored. If the blocks are indexed from 0 to 127, the central section ranges from indexes 56 to 71. A delay of approximately ±550 ms between the reference and test audio streams can be accommodated by this scheme. The test audio stream consists of 128×512=65,536 samples. In any 16×512=8,192 sample sequence within this test segment, a match may be found. To analyze each 8,192 sample sequence starting from the very first sample and then shifting one sample at a time would require the analysis of 65,536−8,192=57,344 unique sequences. Each of these sequences will contain sixteen audio blocks whose Fourier Transforms have to be computed. Fortunately due to the stable nature of audio spectra, the computational process can be simplified significantly by the use of a sliding FFT algorithm.

In implementing a sliding FFT algorithm, the Fourier spectrum of the very first audio block is computed by means of the well-known Fast Fourier Transform (FFT) algorithm. Instead of shifting one sample at a time, the next block for analysis can be located by skipping eight samples with the assumption that the spectral change will be small. Instead of computing the FFT of the new block, the effect of the eight skipped samples can be eliminated and the effect of the eight new samples can be added. The number of block computations is thereby reduced to a more manageable 65,536/8=8,192.

This sliding FFT algorithm can be implemented according to the following steps:

STEP 1: the skip factor k (in this case eight) of the Fourier Transform is applied according to the following equation in order to modify each frequency component $F_{old}(u_0)$ of the spectrum corresponding to the initial sample block in order to derive a corresponding intermediate frequency component $F_1(u_0)$:

$$F_1(u_0) = F_{old}(u_0)\exp -\left(\frac{2\pi u_0 k}{N}\right) \tag{5}$$

where $u_0$ is the frequency index of interest, and where N is the size of a block used in equation (5) and may, for example, be 512. The frequency index $u_0$ varies, for example, from 45 to 70. It should be noted that this first step involves multiplication of two complex numbers.

STEP 2: the effect of the first eight samples of the old N sample block is then eliminated from each $F_1(u_0)$ of the spectrum corresponding to the initial sample block and the effect of the eight new samples is included in each $F_1(u_0)$ of the spectrum corresponding to the current sample block increment in order to obtain the new spectral amplitude $F_{new}(u_0)$ for each frequency index $u_0$ according to the following equation:

$$F_{new}(u_0) = F_1(u_0) + \sum_{m=1}^{m=8} (f_{new}(m) - f_{old}(m))\exp - \left(\frac{2\pi u_0(k - m + 1)}{N}\right) \quad (6)$$

where $f_{old}$ and $f_{new}$ are the time-domain sample values. It should be noted that this second step involves the addition of a complex number to the summation of a product of a real number and a complex number. This computation is repeated across the frequency index range of interest (for example, 45 to 70) to provide the FFT of the new audio block.

Accordingly, in order to determine the channel number of a video program in the DVB environment, a short segment of the audio (i.e. the test audio) associated with a tuned program is compared with a multiplicity of audio segments generated by a DVB tuner scanning across all possible major and minor channels. When a spectral correlation match is obtained between the test audio and the reference audio produced by any particular major-minor channel pair from the DVB scanning tuner, the source of the video program can be identified from the DVB scanning tuner. This source identification is transmitted by the site units 102 and 106 to a home unit 110 which stores this source identification with all other source identifications accumulated from the site units 102 and 106 over a predetermined amount of time. Periodically, the home unit 110 transmits its stored source identifications to a central office 112 for analysis and inclusion into reports as appropriate.

Certain modifications of the present invention have been discussed above. Other modifications will occur to those practicing in the art of the present invention. For example, as described above, the values for the spectral moment $M_n$ are smoothed by iterative averaging across thirty-two consecutive blocks. However, the values for the spectral moment $M_n$ may be iteratively averaged across any desired number of audio blocks.

Also, as described above, two corresponding slopes are considered to match if they have the same sign. However, slopes may be matched based on other criteria such as magnitude of the corresponding slopes.

Moreover, the spectral audio signatures and the spectral audio correlation described above may be used to complement one another. For example, spectral audio correlation may be used to find the major channel and the minor channel to which a receiver is tuned, and spectral audio signatures may then be used to identify the program in the tuned minor channel within the tuned major channel.

On the other hand, spectral audio signatures and spectral audio correlation need not be used in a complementary fashion because each may be used to identify a program or channel to which a receiver is tuned. More specifically, spectral audio signatures generated at the site units 12 and 18 may be communicated through the home unit 16 to the central office 22. In the central office 22, a database of signatures of all possible channels that can be received by a monitored receiver, such as the monitored receivers 14 and 20, is generated and maintained on a round the clock basis. Matching is performed in order to determine the best match between a signature S, which is received from the home unit 16, and a reference signature R, which is available in the database and which is recorded at the same time of day as the signature S. Therefore, the program and/or channel identification is done "off line" at the central office 22.

In the case of audio spectral correlation, the site units 102 and 106 are provided with DVB scanning tuners and data processors which can be used to scan through all major and minor channels available to the monitored receivers 104 and 108, to generate audio with respect to each of the programs carried in each minor channel of each major channel, and to compare this audio with audio derived from the audio output of the monitored receivers 104 and 108. Thus, the audio spectral correlation may be performed locally. Also, as shown by FIG. 4, there is no need for a reference site when audio spectral correlation is performed.

Furthermore, the present invention has been described above as being particularly useful in connection with digital program transmitting and/or receiving equipment. However, the present invention is also useful in connection with analog program transmitting and/or receiving equipment.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of extracting a signature from audio of a program received by a receiver, wherein the signature characterizes the program, the method comprising:

converting the audio to corresponding spectral moments; and converting at least one of the spectral moments to the signature by iteratively smoothing the spectral moments and converting the smoothed spectral moments to the signature, wherein iteratively smoothing the spectral moments comprises iteratively smoothing the spectral moments according to the following equation:

$$M_{n-31} = \frac{\sum_{i=n-31}^{i=n} M_i}{32}$$

and wherein n designates a corresponding audio block, and wherein $M_i$ designates a spectral moment associated with the corresponding audio block.

2. The method of claim 1 wherein the audio has a spectral power, and wherein the conversion of the audio to corresponding spectral moments comprises determining the spectral moments from the spectral power of the audio.

3. The method of claim 2 wherein determining the spectral moments from the spectral power of the audio comprises determining the spectral moments from the spectral power of the audio according to the following equation:

$$M_n = \sum_{k=k_1}^{k=k_2} kT_k$$

wherein n is the audio block, k is a frequency index, wherein $T_k$ is the spectral power of the audio at the frequency index k, and wherein $k_1$ and $k_2$ represent a frequency band within the audio.

4. The method of claim 3 wherein $T_k$ is based upon a FFT of the audio.

5. The method of claim 3 wherein $T_k$ is based upon a MDCT of the audio.

6. The method of claim 3 wherein the signature is $(A_n, D_n)$, wherein $A_n$ is an amplitude of a peak of the spectral moments, and wherein $D_n$ is a time duration between the peak of the spectral moments and a neighboring peak of the spectral moments.

7. The method of claim 1 wherein the signature is $(A_n, D_n)$, wherein $A_n$ is an amplitude of a peak of the smoothed spectral moments, and wherein $D_n$ is a time duration between the peak of the smoothed spectral moments and a neighboring peak of the smoothed spectral moments.

8. The method of claim 1 wherein the audio has a spectral power, and wherein converting at least one of the spectral moments to the signature comprises determining the spectral moments from the spectral power of the audio according to the following equation:

$$M_n = \sum_{k=k_1}^{k=k_2} kT_k$$

wherein n is the audio block, k is a frequency index, wherein $T_k$ is the spectral power of the audio at the frequency index k, and wherein $k_1$ and $k_2$ represent a frequency band within the audio.

9. The method of claim 1 wherein converting at least one of the spectral moments to the signature comprises converting blocks of the audio to corresponding spectral moments, and wherein each of the blocks contains a number of samples of the audio.

10. The method of claim 9 wherein each of the blocks contains N samples of the audio, and wherein each block contains N/2 old samples and N/2 new samples.

11. The method of claim 1 wherein the signature is a signature S, and wherein the method further comprises comparing the signature S to a reference signature R.

12. The method of claim 11 wherein the signature S is derived from a FFT, and wherein the reference signature R is derived from a FFT.

13. The method of claim 11 wherein the signature S is derived from a MDCT, and wherein the reference signature R is derived from a MDCT.

14. The method of claim 11 wherein one of the signature S and the reference signature R is derived from a FFT, and wherein the other of the signature S and the reference signature R is derived from a MDCT.

15. A method of extracting a signature from a digital program received by a digital receiver, wherein the signature characterizes the digital program, the method comprising:

obtaining an encoded audio stream from the digital receiver;

decoding the encoded audio stream to obtain modified discrete cosine transform (MDCT) coefficients representing audio blocks;

determining a spectral moment based on spectral power represented by the MDCT coefficients, wherein the spectral power represented by the MDCT coefficients is weighted by a frequency index when determining the spectral moment;

smoothing the spectral moment by iterative averaging of spectral moments across a plurality of audio blocks; and converting the smoothed spectral moment into the signature based on amplitude maxima in the smoothed spectral moment.

16. The method of claim 15, wherein the plurality of audio blocks comprises 32 audio blocks.

17. The method of claim 16, wherein the smoothing is carried out according to the following equation:

$$M_{n-31} = \frac{\sum_{i=n-31}^{i=n} M_i}{32}$$

and wherein n designates a corresponding audio block, and wherein $M_i$ designates a spectral moment associated with the corresponding audio block.

18. The method of claim 17, wherein the signature comprises two bytes of data, wherein a first byte of data represents a maximum of a peak amplitude of the smoothed spectral moment.

19. The method of claim 15, wherein the spectral moment is based on spectral power represented by MDCT coefficients representing a frequency range from about 4.3 kilohertz (kHz) to about 6.5 kHz.

20. The method of claim 15, wherein determining a spectral moment based on spectral power represented by the MDCT coefficients is performed according to the following equation:

$$M_n = \sum_{k=k_1}^{k=k_2} kT_k$$

wherein n is the audio block, k is a frequency index, wherein $T_k$ is the spectral power of the audio at the frequency index k as represented by the MDCT coefficients, and wherein $k_1$ and $k_2$ represent a frequency band within the audio.

21. The method of claim 20, wherein $k_1$ and $k_2$ are frequency indices that are approximately 45 and approximately 70, respectively.

* * * * *